US012769019B2

(12) United States Patent
Lyapunov et al.

(10) Patent No.: US 12,769,019 B2
(45) Date of Patent: Oct. 20, 2026

(54) METHODS AND SYSTEMS FOR DETERMINING PROPPANT CONCENTRATION IN FRACTURING FLUIDS

(71) Applicant: SCHLUMBERGER TECHNOLOGY CORPORATION, Sugar Land, TX (US)

(72) Inventors: Konstantin Mikhailovich Lyapunov, Novosibirsk (RU); Denis Viktorovich Bannikov, Sugar Land, TX (US); Ivan Vladimirovich Velikanov, Lysaker (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/103,837

(22) PCT Filed: Aug. 18, 2023

(86) PCT No.: PCT/US2023/030552
§ 371 (c)(1),
(2) Date: Feb. 14, 2025

(87) PCT Pub. No.: WO2024/039832
PCT Pub. Date: Feb. 22, 2024

(65) Prior Publication Data

US 2026/0050096 A1 Feb. 19, 2026

(30) Foreign Application Priority Data

Aug. 18, 2022 (RU) ................................ 2022122482

(51) Int. Cl.
*E21B 43/267* (2006.01)
*G01V 1/18* (2006.01)
*G01V 1/30* (2006.01)

(52) U.S. Cl.
CPC ............ *G01V 1/186* (2013.01); *E21B 43/267* (2013.01); *G01V 1/30* (2013.01); *E21B 2200/20* (2020.05); *E21B 2200/22* (2020.05)

(58) Field of Classification Search
CPC .......... G01V 1/30; G01V 1/186; E21B 43/26; E21B 43/267; E21B 2200/20; E21B 2200/22
See application file for complete search history.

(56) References Cited

U.S. PATENT DOCUMENTS 2,903,884 A 9/1959 Kritz
6,543,281 B2 4/2003 Pelletier
(Continued)

FOREIGN PATENT DOCUMENTS

RU 2362128 C1 7/2009
RU 2483284 C1 5/2013
(Continued)

OTHER PUBLICATIONS

Benabdelkarim ,M. et al., "Nonradioactive Densitometer for Continuous Monitoring of Cement Mixing Process", First International Conference on Health, Safety and Environment, SPE 23262, Nov. 10, 1991, pp. 539-545, The Hague, The Netherlands.

*Primary Examiner* — Angela M Ditrani Leff
(74) *Attorney, Agent, or Firm* — Jeffrey D. Frantz

(57) ABSTRACT

Monitoring and real-time adjustments of proppant concentrations during a hydraulic fracturing treatment may be advantageous, particularly when the goal is to create a heterogeneous proppant pack in the fracture. The proppant concentration may be measured by analyzing noise spectra as the fracturing fluid passes through a tubular body at the surface or downhole in the subterranean well.

20 Claims, 5 Drawing Sheets

(56) References Cited

U.S. PATENT DOCUMENTS

| | | | | |
|---|---|---|---|---|
| 6,688,176 | B2 | 2/2004 | Storm, Jr. | |
| 7,069,776 | B2 | 7/2006 | Tudor | |
| 7,228,740 | B2 | 6/2007 | Sinha | |
| 7,552,619 | B2 | 6/2009 | Andle | |
| 8,220,313 | B2 | 7/2012 | Lopatin | |
| 10,301,934 | B2 | 5/2019 | Brady | |
| 11,499,406 | B2 | 11/2022 | Isaev | |
| 12,585,942 | B2 * | 3/2026 | Sun | G06N 3/044 |
| 2004/0007059 | A1 | 1/2004 | Tudor | |
| 2016/0102528 | A1 * | 4/2016 | Wise | E21B 21/062<br>166/336 |
| 2020/0109612 | A1 | 4/2020 | Granville | |
| 2020/0355838 | A1 | 11/2020 | Venna | |
| 2021/0017845 | A1 | 1/2021 | Madasu | |
| 2021/0087925 | A1 * | 3/2021 | Heidari | G06N 3/0442 |

FOREIGN PATENT DOCUMENTS

| | | | | |
|---|---|---|---|---|
| WO | 2012174065 | A1 | 12/2012 | |
| WO | WO-2018117890 | A1 * | 6/2018 | E21B 43/26 |
| WO | WO-2019035858 | A1 * | 2/2019 | G01V 1/345 |
| WO | WO-2019222031 | A1 * | 11/2019 | G06F 9/5061 |
| WO | WO-2021016212 | A1 * | 1/2021 | E21B 43/26 |
| WO | WO-2021016412 | A1 * | 1/2021 | E21B 47/06 |

* cited by examiner

METHODS AND SYSTEMS FOR DETERMINING PROPPANT CONCENTRATION IN FRACTURING FLUIDS

BACKGROUND

This application is a National Stage and claims benefit of PCT Patent Application No. PCT/US2023/030552, entitled "METHODS AND SYSTEMS FOR DETERMINING PROPPANT CONCENTRATION IN FRACTURING FLUIDS," filed Aug. 18, 2023, which claims the benefit of RU patent application No. 2022122482, entitled "METHODS AND SYSTEMS FOR DETERMINING PROPPANT CONCENTRATION IN FRACTURING FLUIDS," filed Aug. 18, 2022, the disclosure of which is hereby incorporated herein by reference.

The statements in this section merely provide background information related to the present disclosure and may not constitute prior art.

During a hydraulic fracturing treatment, specialized equipment pumps fluid into a well faster than it can escape into the formation. Pressure on the formation rises until it breaks down, or fractures. Continued pumping causes the fracture to propagate away from the wellbore, increasing the formation surface area from which hydrocarbons can flow into the wellbore. This helps the well achieve a higher production rate. As a result, operators recover their well-development investments more quickly, and the ultimate amount of produced hydrocarbons increases dramatically.

During hydraulic fracturing, two principal substances—proppants and fracturing fluids—are pumped into a well. Proppants are particles that hold the fractures open and preserve the newly formed pathways to enable hydrocarbon production. The particles are carefully sorted for size and sphericity to form an efficient conduit, or proppant pack, which enables fluids to flow from the reservoir to the wellbore. Some proppants also feature a resin coating that binds the particles together after the proppant is placed in the well, thereby improving pack stability. Generally, larger and more spherical proppants provide more-permeable proppant packs or, in industry vernacular, packs with higher conductivity.

Fracturing treatments consist of two principal fluid stages. The first stage, or pad stage, does not contain proppant. Fluid is pumped through casing perforations at a rate and pressure sufficient to break down the formation and create a fracture. The second stage, or proppant-slurry stage, transports proppant through the perforations into the open fracture. The fracture closes onto the proppant when pumping ceases, holding the proppant in place while the fracturing fluid flows back into the wellbore—as well as during hydrocarbon production.

Fracturing fluids must be viscous to create and propagate a fracture as well as transport the proppant down the wellbore and into the fracture. Once the treatment is completed, the viscosity must decrease to promote rapid and efficient evacuation of the fracturing fluid from the well. Ideally, the proppant pack should also be free of fluid residue, which may impair conductivity and hydrocarbon production.

For many decades, chemists and engineers have worked to develop proppants and fracturing fluids that produce the ideal propped fracture. As a result, the chemical and physical nature of these materials has changed significantly over time. Proppants have evolved from crude materials such as nut shells, to naturally occurring sands and to high-strength spheres manufactured from ceramics or bauxite. Fracturing fluids progressed from gelled oils to linear- and crosslinked-polymer solutions. Chemical breakers were introduced to decompose the polymer, reduce the amount of polymer residue in the fracture and improve conductivity. Next, essentially residue-free fluid systems that employed viscoelastic surfactants as thickeners were introduced. The proppant-pack conductivity in wells treated with such fluids nearly equaled the theoretical prediction.

Having maximized proppant-pack conductivity, the industry began to investigate ways to further improve hydraulic-fracturing results. Since the advent of hydraulic fracturing, engineers strove to completely fill the fracture with proppant—in other words, create a continuous proppant pack. Technology was developed to create discontinuous proppant packs containing discrete proppant columns surrounded by open channels. This approach separates the load-bearing task of the proppant pack from that of providing a fluid pathway. The resulting proppant packs are orders of magnitude higher than that which the cleanest conventional proppant pack provided. This "pulse fracturing" technology is exemplified by the HiWAY® stable-flow channel hydraulic fracturing technique, available from Schlumberger.

The pulse fracturing method involves changing the manner by which proppant is delivered downhole. In the conventional method, proppant is present throughout the entire proppant-slurry volume. The pulse fracturing method employs alternating fluid pulses—with and without proppant, and the series of proppant slugs settles in the fracture and forms columns (FIG. 1).

Hydraulic fracturing operations benefit from accurate measurement and monitoring of the proppant concentration in the fracturing fluid. This is especially true when the pulse fracturing technique is performed.

For years radioactive densitometers have been used to measure fluid density, from which a proppant concentration may be inferred. This technique provides a nonintrusive, continuous density measurement for any fluid flowing in a pipe. The technique is based on the absorption of gamma rays or x-rays by the measured fluid. A densitometer comprises a radioactive source on one side of the pipe, a radiation detector on the other side of the pipe and an electronic panel to provide a signal reading (FIG. 2).

As fluid passes through the pipe 210, gamma rays emitted by the source 245 are attenuated in proportion to the fluid density. The detector 240 senses the gamma rays transmitted through the fluid 220 and converts this signal into an electrical signal. The electronic panel 280 processes the electrical signal into a density indication. Denser materials absorb more radiation, resulting in the detection of fewer gamma rays. Thus, the signal output of the detector varies inversely with respect to density. Most densitometers use a radioactive isotope with an extended half-life. A densitometer using $^{137}Cs$ can function accurately for nearly 30 years if the electronic components are maintained.

One disadvantage associated with using radioactive densitometers is the stringent regulations imposed by governments of various jurisdictions on the proper handling, transportation and storage of radioactive materials used in a radioactive densitometer. Accordingly, efforts have been made to use non-radioactive systems to measure the density of oilfield fluids.

Coriolis mass flowmeters have been employed to measure the density of cement slurries, as described in the following publication. Benabdelkarim M and Galiana C: "Nonradioactive Densitometer for Continuous Monitoring of Cement Mixing Process," paper SPE 23262 (November 1991). However, the measuring tube in the Coriolis mass flowmeter can be eroded very quickly when abrasive proppant slurries are pumped at high rates through the flowmeter.

There remains a need for non-radioactive densitometers that are suitable for use in a hydraulic fracturing environment.

SUMMARY

The present disclosure proposes methods for measuring a monitoring proppant concentration during a hydraulic fracturing treatment.

In an aspect, embodiments relate to methods for determining the proppant concentration in a fracturing fluid. Hydrophones or high-frequency pressure sensors are installed in a tubular body. The fracturing fluid flows through the tubular body and hydrodynamic noise spectra are measured. Machine learning or deep learning models are employed to analyze the hydrodynamic noise spectra and infer the proppant concentration in the fracturing fluid.

In a further aspect, embodiments relate to methods for performing a fracturing treatment. Hydrophones or high-frequency pressure sensors are installed in a tubular body. The fracturing fluid flows through the tubular body and hydrodynamic noise spectra are measured. Machine learning or deep learning models are employed to analyze the hydrodynamic noise spectra and infer the proppant concentration in the fracturing fluid. During the fracturing treatment, the proppant concentration is adjusted.

DETAILED DESCRIPTION

Figure 1:
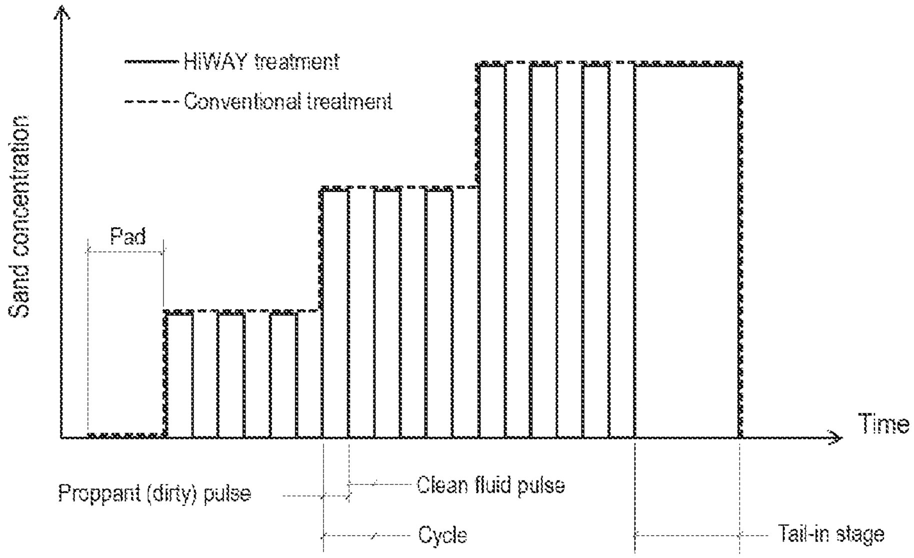
Figure 1 (Prior Art)
FIG. 1 is a diagram comparing conventional fracturing treatments to pulsed-fracturing treatments.
Figure 2:
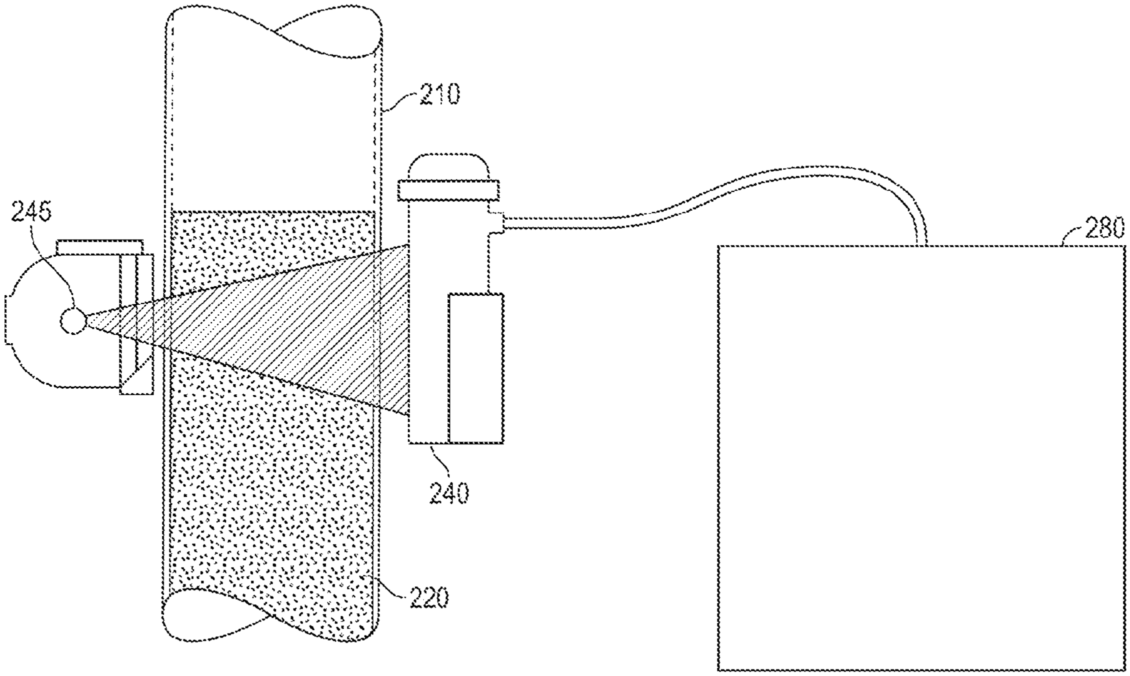
Figure 2 (Prior Art)
FIG. 2 is a schematic diagram of a radioactive densitometer.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions are made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a concentration range listed or described as being useful, suitable, or the like, is intended that any concentration within the range, including the end points, is to be considered as having been stated. For example, "a range of from 1 to 10" is to be read as indicating each possible number along the continuum between about 1 and about 10. Furthermore, one or more of the data points in the present examples may be combined by themselves, or may be combined with one of the data points in the specification to create a range, and thus include each possible value or number within this range. Thus, even if specific data points within the range, or even no data points within the range, are explicitly identified or refer to a few specific, it is to be understood that inventors appreciate and understand that any data points within the range are to be considered to have been specified, and that inventors possessed knowledge of the entire range and the points within the range.

As used herein, "embodiments" refers to non-limiting examples disclosed herein, whether claimed or not, which may be employed or present alone or in any combination or permutation with one or more other embodiments. Each embodiment disclosed herein should be regarded both as an added feature to be used with one or more other embodiments, as well as an alternative to be used separately or in lieu of one or more other embodiments. It should be understood that no limitation of the scope of the claimed subject matter is thereby intended, any alterations and further modifications in the illustrated embodiments, and any further applications of the principles of the application as illustrated therein as would normally occur to one skilled in the art to which the disclosure relates are contemplated herein.

Moreover, the schematic illustrations and descriptions provided herein are understood to be examples, and components and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

The present disclosure proposes acoustic methods for determining the proppant concentration in a fracturing fluid during a hydraulic fracturing treatment.

Numerous methods have been presented in the industry for monitoring particle concentrations in flowing fluids. In addition to those discussed above, the following are notable.

U.S. Pat. No. 2,903,884, "Densitometer," presents a system that relies on acoustic impedance to determine the density of a fluid. The method does not consider the presence of particles in the fluid.

U.S. Pat. No. 7,069,776, "Method For Measuring Particle Concentration During Injection Pumping Operations," describes using an acoustic sensor to detect noise emanating from a particulate-laden fluid flowing through a pipe. The frequency range is limited to the audible sound region and the reference does not describe machine learning or neural networks to analyze the detected sound.

U.S. Pat. No. 7,228,740B2. "Noninvasive Characterization of a Flowing Multiphase Fluid Using Ultrasonic Interferometry," presents an apparatus for noninvasively monitoring the flow and/or composition of a flowing fluid using ultrasound. The position of the resonance peaks for a fluid excited by a swept-frequency ultrasonic signal have been found to change frequency both in response to a change in composition and in response to a change in the flow velocity thereof.

China Patent CN101517382B, "Investigating Density or Specific Gravity of Materials; Analyzing Materials By Determining Density or Specific Gravity Using Variation of the Resonant Frequency of an Element Vibrating in Contact With the Material Submitted to Analysis." relates to a system for determining or monitoring a process quantity, in particular the density of a medium, with an excitation/receiving unit that excites a unit that is capable of mechanical vibration.

U.S. Pat. No. 7,552,619B2, "Measurement of Density and Viscoelasticity with a Single Acoustic Wave Sensor," observes that the common mode frequency shift of two resonant frequencies is related to mass loading due to the entrapped fluid, while the energy absorbed by the fluid, or phase shift of one of the resonant frequencies, is related to the viscosity/density product of the fluid. Extracting the viscosity is a matter of mechanical manipulation.

Russia Patent RU 2362128C1, "Measurement Method of Homogeneous Media Acoustic Resistance and Device for Its Implementation,". presents a system that measures the acoustic resistance of homogeneous media.

U.S. Pat. No. 10,301,934B2, "Downhole X-ray Densitometer," presents a system to determine one or more characteristics of a flowing fluid. The densitometer has one or more downhole x-ray sources and one or more downhole x-ray detectors A fluid is allowed to flow past the x-ray sources. X-rays emitted by the x-ray sources and that have travelled through the flowing fluid are detected by the x-ray detectors.

U.S. Pat. No. 6,543,281B2, "Downhole Densitometer," discloses a measurement device that determines fluid properties from vibration frequencies of a sample cavity and a reference cavity. In one embodiment, the measurement device includes a sample flow tube, a reference flow tube, vibration sources and detectors mounted on the tubes, and a measurement module.

Russia Patent RU2483284C1, "Hydrostatic Downhole Densitometer," discloses a hydrostatic downhole densitometer that comprises a body with two differential pressure sensors, which separate an inner cavity of the body into three chambers, two of which arranged at the body ends to receive pressure of the environment, and a chamber arranged between differential pressure sensors is filled with a liquid having available physical properties.

Australia Patent Application 200230142882, "Single Tube Downhole Densitometer," discloses a measurement device for determining fluid properties from vibration amplitudes of a sample cavity.

In this disclosure, methods are proposed for estimating proppant concentration in fracturing fluids on the surface and in a subterranean well. Measurements of hydrodynamic noise are taken and combined with machine learning or deep learning methods to infer the proppant concentration.

There at least two ways by which a change of proppant concentration affects the hydrodynamic noise of a flowing fracturing fluid. First, varying the proppant concentration changes the fluid's Reynolds number due to changes of effective viscosity and slurry density. The hydrodynamic noise spectra may depend on the Reynolds number, which further depends on both the viscosity and density of the fluid. Second, collisions of proppant particles with themselves and pipe walls also are a source of emission of noise whose spectra depend on proppant concentration.

The sensors and equipment that may be used to practice the disclosed methods include hydrophones and acquisition systems capable of measuring hydrodynamic noise having a frequency up to 100 kHz. The sensors and equipment may be installed at the surface or downhole in the subterranean well.

Figure 3:
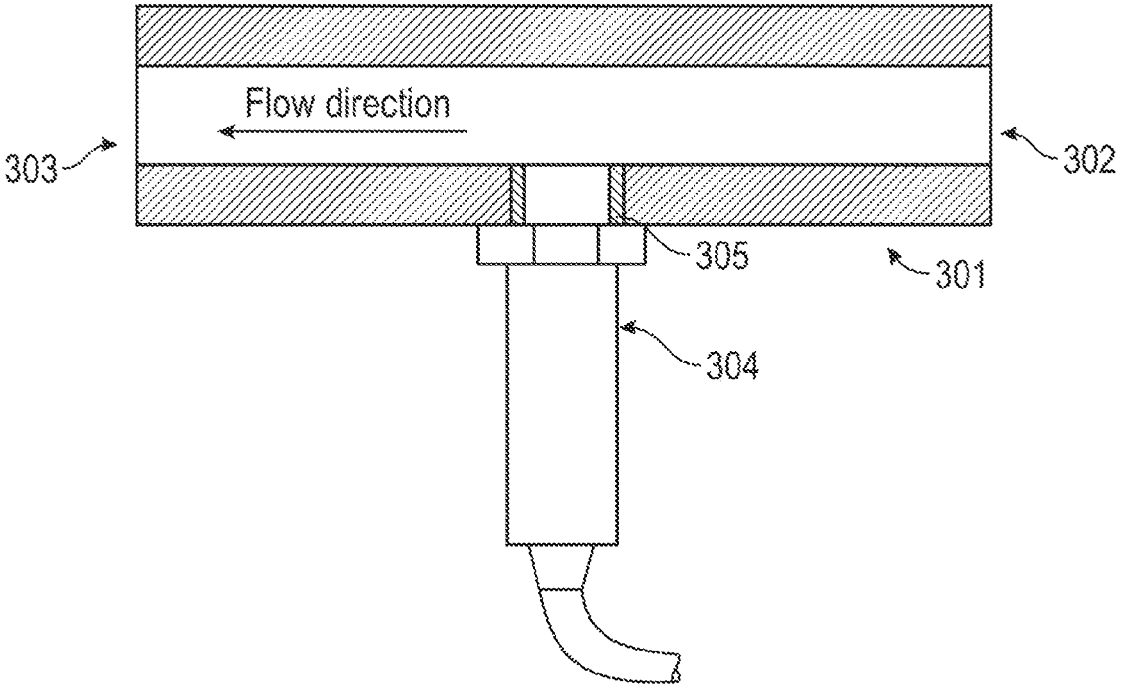
FIG. 3 depicts an embodiment of the disclosure performed at the surface.

FIG. 3 depicts a surface implementation of the disclosed method. The apparatus comprises a tubular body 301 having an inlet 302 and an outlet 303. The tubular body may be placed in a fracturing fluid blender, pumps, etc. In this figure a hydrophone 304 is connected via a threaded port 305. To increase the production of hydrodynamic noise, the tubular body may further be equipped with an artificial cavity on the interior wall, or with artificial grooves on the interior wall, or with any ledge on the interior surface of the wall. Or, an immobile object or rotating blades may be placed in the fluid flow. Or, an internal diameter change may be present in the interior of the tubular body.

Figure 4:
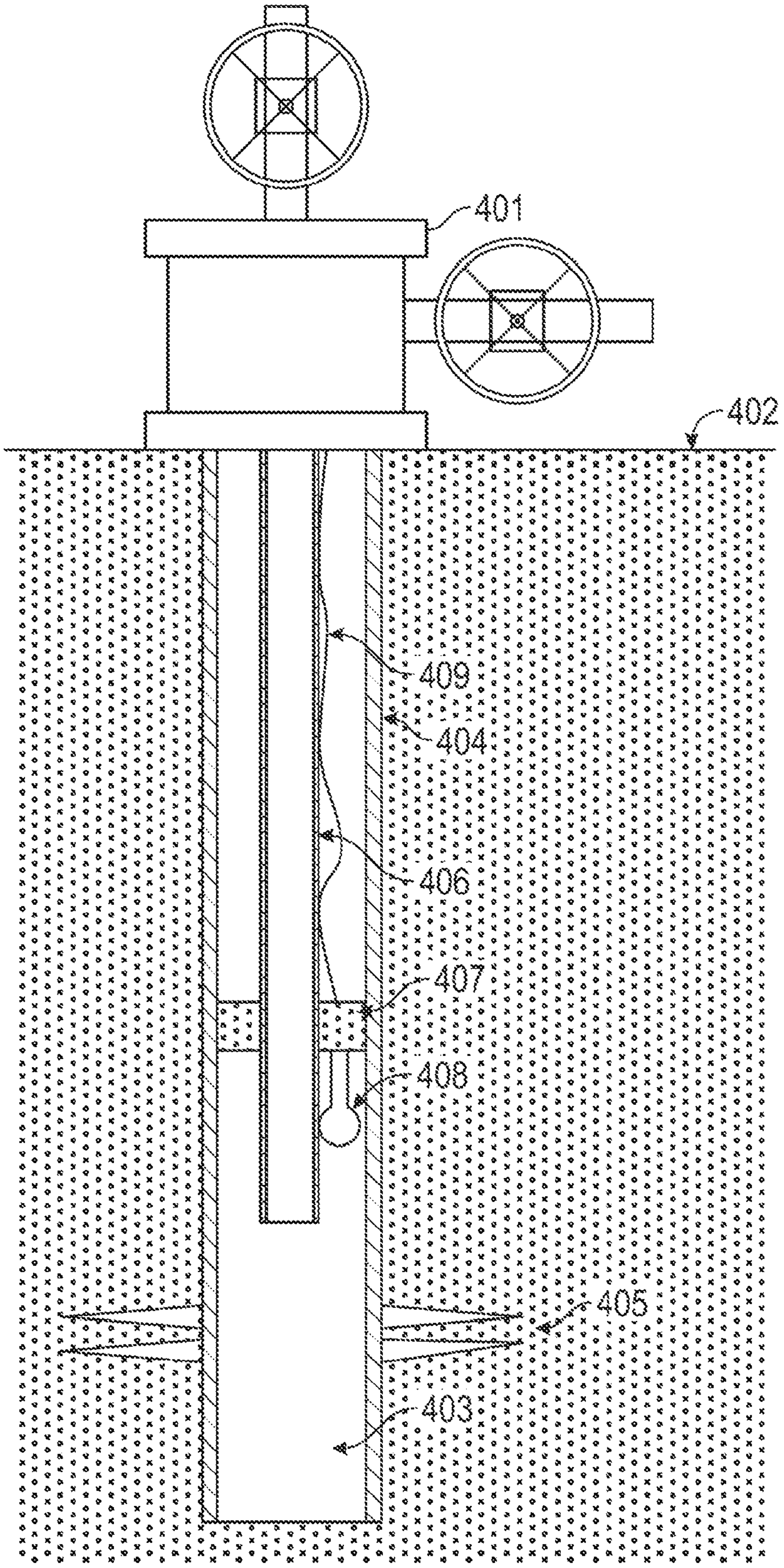
FIG. 4 depicts an embodiment of the disclosure performed downhole in a subterranean well.

FIG. 4 depicts a downhole implementation of the disclosed method. The figure is a schematic diagram of a cased and perforated well. A wellhead 401 is placed at the surface 402. The well 403 comprises casing 404 that has been perforated 405 in preparation for a fracturing treatment. Tubing 406 is inserted inside the casing 404, and a packer 407 is installed to which a hydrophone 408 is attached. Information from the hydrophone is transmitted to the surface via a cable 409.

In an aspect, embodiments relate to methods for determining the proppant concentration in a fracturing fluid. Hydrophones or high-frequency pressure sensors are installed in a tubular body. The fracturing fluid flows through the tubular body and hydrodynamic noise spectra are measured. Machine learning or deep learning models are employed to analyze the hydrodynamic noise spectra and infer the proppant concentration in the fracturing fluid.

In a further aspect, embodiments relate to methods for performing a fracturing treatment. Hydrophones or high-frequency pressure sensors are installed in a tubular body. The fracturing fluid flows through the tubular body and hydrodynamic noise spectra are measured. Machine learning or deep learning models are employed to analyze the hydrodynamic noise spectra and infer the proppant concentration in the fracturing fluid. For fixed pumping rates (e.g., 10, 20, 30, 40, 50 . . . bbl/min) in a specific tubular body, hydrodynamic noise spectra may be acquired, or calculated using software addressing a specific fluid having different proppant concentrations (e.g., 1, 2, 3, 4, 5 . . . ppa). The machine learning or deep learning model is trained using the acquired data. Thus, any current proppant concentration in flowing fluid may be inferred by regression using the machine learning or deep learning model, having measured hydrodynamic noise spectra and fluid rate values as inputs.

During the fracturing treatment, the proppant concentration is adjusted. The fracturing treatment may create a homogeneous or a heterogeneous proppant pack in the fracture. Furthermore, the disclosed methods may allow operators to make proppant-concentration adjustments in real-time during the fracturing treatment.

For all aspects, the tubular body may comprise surface pipes, surface manifolds, liners or packers.

For all aspects, the methods may be performed using laboratory measurements.

For all aspects, the hydrophones or high-frequency sensors may be installed prior to a fracturing treatment, and the disclosed methods may be performed during the fracturing treatment.

For all aspects, the disclosed methods may be performed using a modeling approach. The modeling approach may comprise using software comprising ANSYS or STAR-CCM+.

For all aspects, the machine learning methods may comprise linear regression models, ensemble models or neural networks or a combination thereof.

EXAMPLE

The following example is illustrative only, and is not meant to limit the present disclosure in any way.

Using an apparatus wherein fluid was rotating inside a tubular body, hydrodynamic noise of a flowing fracturing fluid was recorded at proppant concentrations between 0 ppa and 3 ppa. The unit "ppa" is an industry standard referred to as "pounds of proppant added." One ppa means that one pound of proppant is added to each gallon of fracturing fluid. It should not be confused with the more common pounds per gallon or lbm/gal. During hydraulic fracturing treatments, "ppa" better reflects field practice.

The following experimental workflow was followed.

1. 269 noise spectra were recorded from fluids flowing at the same speed, but containing various proppant concentrations between 0 and 3 ppa.
2. The 269 spectra were mixed in random order to form a data set. This procedure is called "shuffling."
3. The 269 spectra were randomly divided into two groups. There were 209 spectra in the first group and 60 spectra in the second group. This procedure is called "splitting."
4. The 209 spectra in the first group were used to train a neural network.
5. The 60 spectra in the second group were used as input data for the trained neural network to infer proppant concentrations in the fluids, corresponding to the spectra.
6. The inferred proppant concentrations were compared to the real proppant concentrations, allowing determination of the accuracy of the approach.

Figure 5:
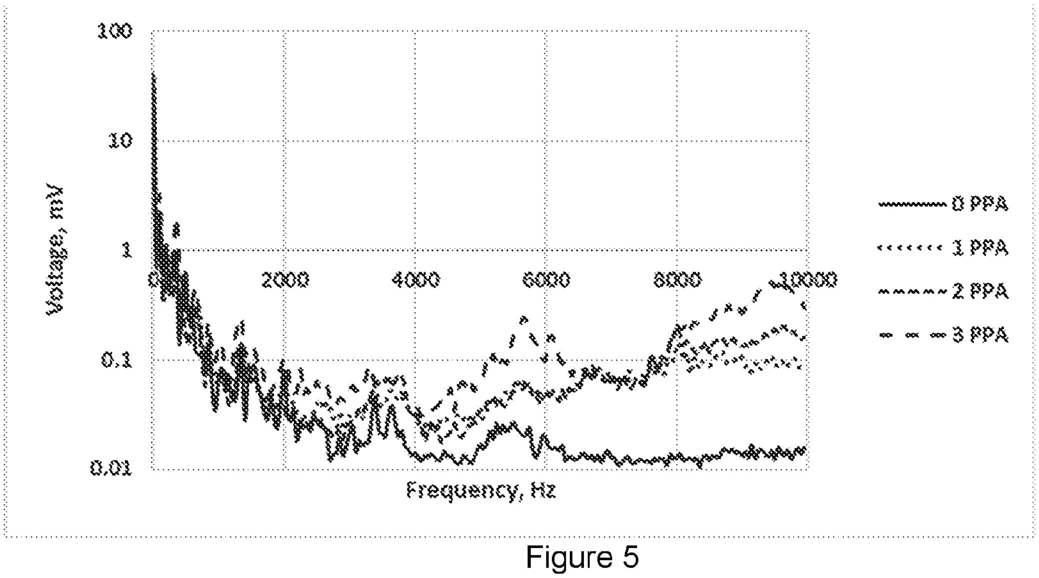
FIG. 5 is a plot of noise spectra recorded by hydrophones while fracturing fluids with various proppant concentrations were pumped through a tubular body.

Laboratory measured hydrodynamic noise spectra are shown in FIG. 5. Machine learning and deep learning methods were used to determine the proppant concentrations. The curves are the result of 269 acquired spectra as described by the workflow above.

The workflow was repeated eight times to estimate the accuracy of the disclosed approach. The results, shown in Table 1, confirmed that the approach was 100% accurate in all cases.

TABLE 1

Results of neural network approach for inferring proppant concentrations in fracturing fluids.

| Run # | 1 | 2 | 3 | 4 | 5 | 6 | 7 | 8 |
|---|---|---|---|---|---|---|---|---|
| Accuracy | 100 | 100 | 100 | 100 | 100 | 100 | 100 | 100 |

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. Accordingly, the foregoing description should not be read as pertaining only to the precise structures described and shown in the accompanying drawings, but rather should be read as consistent with and as support for the following claims, which are to have their fullest and fairest scope.

The invention claimed is:

1. A method for determining a proppant concentration in a fracturing fluid, comprising stages of:

(a) installing hydrophones or pressure sensors in a tubular body;

(b) flowing the fracturing fluid through the tubular body and measuring hydrodynamic acoustic noise spectra;

(c) analyzing inputs via a trained model comprising a machine learning model or a deep learning model, wherein the inputs comprise the hydrodynamic acoustic noise spectra and a fluid flow rate of the fracturing fluid; and (d) generating one or more outputs via the trained model comprising the machine learning model or the deep learning model in response to analyzing the inputs comprising the hydrodynamic acoustic noise spectra and the fluid flow rate of the fracturing fluid, wherein the one or more outputs comprise the proppant concentration in the fracturing fluid, wherein the trained model is trained via an analysis of a plurality of datasets for a plurality of different proppant concentrations, wherein each of the plurality of datasets comprises a first input comprising a known value of proppant concentration of a sample fluid, a second input comprising a known value of fluid flow rate of the sample fluid, and a third input comprising a known profile of hydrodynamic acoustic noise spectra of the sample fluid, wherein the trained model correlates the known profile of hydrodynamic acoustic noise spectra with the known value of proppant concentration and the known value of fluid flow rate for each of the plurality of datasets.

2. The method of claim 1, wherein the tubular body comprises surface pipes, surface manifolds, liners or packers.

3. The method of claim 1, wherein the trained model is trained via the analysis of the plurality of datasets for the plurality of different proppant concentrations and a plurality of different fluid flow rates.

4. The method of claim 1, wherein the hydrophones or pressure sensors are installed prior to a fracturing treatment, and stages (c) and (d) are performed during the fracturing treatment.

5. The method of claim 1, wherein stage (d) comprises inferring the proppant concentration based on the inputs via the trained model.

6. The method of claim 5, wherein stage (d) comprises inferring by regression the proppant concentration based on the inputs via the trained model.

7. The method of claim 1, wherein the trained model comprising the machine learning model or the deep learning model comprises one or more linear regression models, one or more ensemble models, or one or more neural networks, or combinations thereof.

8. The method of claim 1, wherein the hydrodynamic acoustic noise spectra cover a frequency range between 1 kHz and 100 kHz.

9. A method for determining a proppant concentration in a fracturing fluid, comprising stages of:

(a) training to generate a trained model comprising a machine learning or a deep learning model, wherein the training comprises processing a plurality of datasets for a plurality of different proppant concentrations and a plurality of different fluid flow rates, wherein, for each of the plurality of datasets, the training comprises:
analyzing a first input comprising a known value of proppant concentration of a sample fluid;
analyzing a second input comprising a known value of fluid flow rate of the sample fluid;
analyzing a third input comprising a known plot or curve of hydrodynamic acoustic noise spectra of the sample fluid; and
correlating the known plot or curve of hydrodynamic acoustic noise spectra with the known value of proppant concentration and the known value of fluid flow rate;
(b) installing hydrophones or pressure sensors in a tubular body;
(c) flowing the fracturing fluid through the tubular body and measuring hydrodynamic acoustic noise spectra;
(d) analyzing inputs via the trained model comprising the machine learning model or the deep learning model, wherein the inputs comprise the hydrodynamic acoustic noise spectra and a fluid flow rate of the fracturing fluid; and
(e) generating one or more outputs via the trained model comprising the machine learning or the deep learning model in response to analyzing the inputs comprising the hydrodynamic acoustic noise spectra and the fluid flow rate of the fracturing fluid, wherein generating the one or more outputs comprises inferring the proppant concentration based on the inputs via the trained model; and
(f) during a fracturing treatment, adjusting the proppant concentration.

10. The method of claim 9, wherein the tubular body comprises surface pipes, surface manifolds, liners or packers.

11. The method of claim 9, wherein the training further comprises processing a second plurality of datasets for a second plurality of different proppant concentrations and a second plurality of different fluid flow rates, wherein, for each of the second plurality of datasets, the training comprises:
generating an inferred value of proppant concentration via the trained model based on a second known plot or curve of hydrodynamic acoustic noise spectra and a second known value of fluid flow rate;
comparing the inferred value of proppant concentration with a second known value of proppant concentration; and
confirming an accuracy of the inferred value of proppant concentration relative to the second known value of proppant concentration.

12. The method of claim 9, wherein the hydrophones or pressure sensors are installed prior to the fracturing treatment, and stages (d) and (e) are is performed during the fracturing treatment.

13. The method of claim 9, wherein stage (e) comprises inferring the proppant concentration via a modeling software comprising a simulation software.

14. The method of claim 9, wherein stage (e) comprises inferring by regression the proppant concentration based on the inputs via the trained model.

15. The method of claim 9, wherein the trained model comprising the machine learning model or the deep learning model comprises one or more linear regression models, one or more ensemble models, or one or more neural networks, or combinations thereof.

16. The method of claim 9, wherein the hydrodynamic acoustic noise spectra cover a frequency range between 1 kHz and 100 kHz.

17. The method of claim 9, wherein the hydrodynamic acoustic noise spectra are measured at a surface of a subterranean well.

18. The method of claim 9, wherein the fracturing treatment creates a homogeneous proppant pack in a fracture.

19. The method of claim 9, wherein the fracturing treatment creates a heterogeneous proppant pack in a fracture.

20. The method of claim 9, wherein the adjusting the proppant concentration is performed in real-time in response to the inferred proppant concentration.

* * * * *